(No Model.)

H. J. FREDERICK.
SAW.

No. 538,107. Patented Apr. 23, 1895.

WITNESSES:

INVENTOR
H. J. Frederick
BY
Munn & Co
ATTORNEYS.

UNITED STATES PATENT OFFICE.

HENRY J. FREDERICK, OF BRAINERD, MINNESOTA.

SAW.

SPECIFICATION forming part of Letters Patent No. 538,107, dated April 23, 1895.

Application filed June 27, 1894. Serial No. 515,878. (No model.)

*To all whom it may concern:*

Be it known that I, HENRY J. FREDERICK, of Brainerd, in the county of Crow Wing and State of Minnesota, have invented a new and Improved Saw, of which the following is a full, clear, and exact description.

The invention relates to the construction of buck saws, fret saws, and other saws having frames, and its object is to provide a new and improved saw, which is comparatively simple and durable in construction, and arranged to permit the operator to quickly give at any time the desired tension to the saw blade, and to permit of removing the saw blade without disconnecting the members of the saw frame.

The invention consists in certain parts and details, and combinations of the same, as will be hereinafter more fully described and then pointed out in the claims.

Reference is to be had to the accompanying drawings, forming part of this specification, in which similar letters of reference indicate corresponding parts in all the views.

Figure 1:
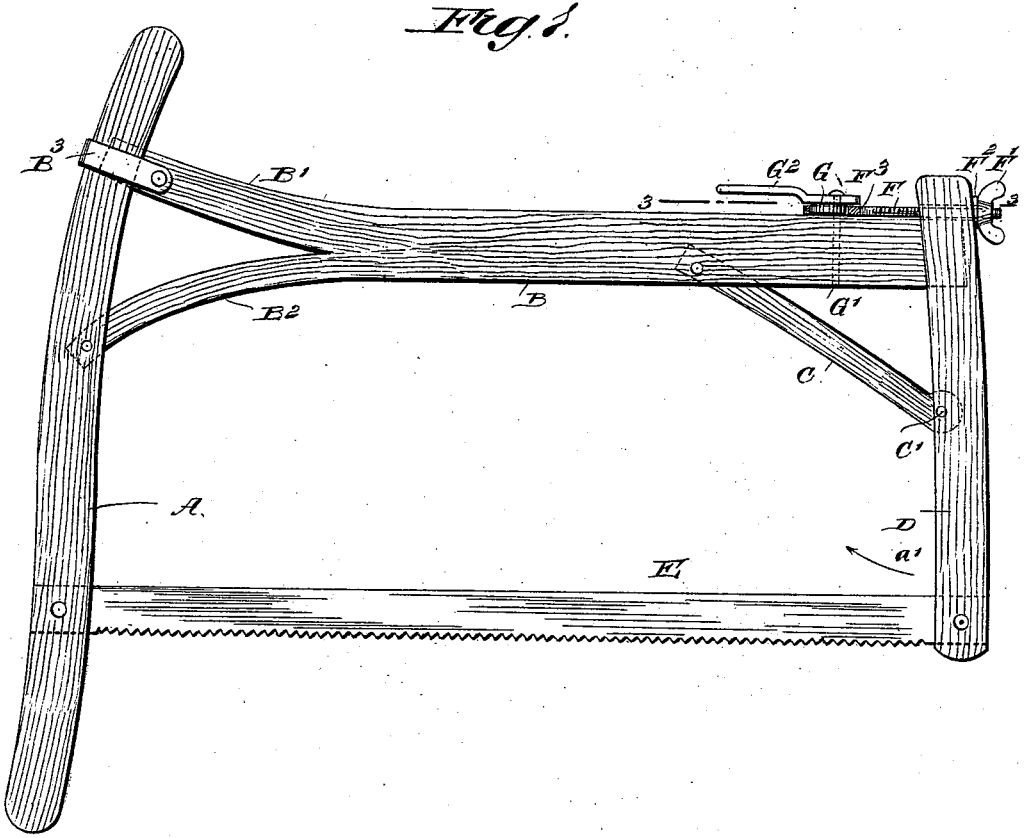
Figure 2:
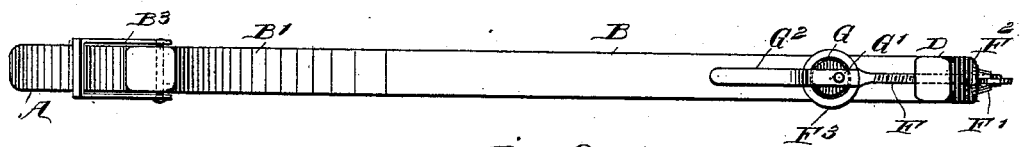
Figure 3:
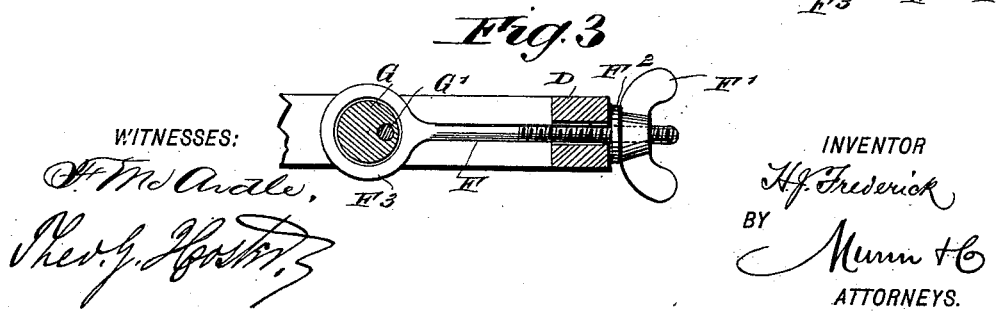

Figure 1 is a side elevation of the improvement. Fig. 2 is a plan view of the same; and Fig. 3 is an enlarged sectional plan view of part of the improvement, on the line 3—3 of Fig. 1.

The improved saw is provided with the usual handle bar A, rigidly connected with the spacer bar B, carrying a brace C, on which is pivoted, at C', the front bar D, to which the front end of the saw blade E is secured, the latter being also attached in the usual manner to the handle bar A.

In the upper end of the front bar D is held a longitudinally-extending screw rod F, having a wing nut F', abutting against a washer F² resting on the front face or edge of the front bar D. The screw rod F has its rear portion extending over the top surface of the spacer bar B, and its rear end is formed with an eccentric strap F³, in which works an eccentric G, mounted to turn on a pin G' held in the spacer bar B. On the top of the eccentric G is secured a handle G², adapted to be taken hold of by the operator, to turn the eccentric in the eccentric strap F³, so as to impart a swinging motion to the front bar D, to loosen the saw blade E, or to give the desired tension to the same.

It will be seen that when the several parts are in the position illustrated in the drawings, then the saw blade E is under tension, and when the operator now desires to release the tension of the saw blade, he swings the handle G² to the front, so as to give a half turn to the eccentric G, whereby the screw rod F is moved outward, and consequently the front bar D can swing in the direction of the arrow a', to loosen the saw blade E.

In order to again give the desired tension to the saw blade the operator swings the handle G² rearward, back to the position shown in the drawings, so that the screw rod F is moved longitudinally and inwardly to pull with the nut F' on the upper end of the front bar D, so as to cause the latter to swing in the inverse direction of the arrow a', and from its fulcrum at C' on the brace C. By the operator adjusting the wing nut F', more or less tension can be given to the saw blade E.

In order to take up the strain when applying tension to the saw blade, I provide the spacer bar B with the forks B' and B², of which the former is connected by a strap B³ with the handle bar A, so that the said strap takes up the strain at the time the handle G² is swung into an innermost position, as shown in the drawings.

By the arrangement described, the operator is enabled by the simple movement of the handle G² as above described, to give the desired tension to the saw blade, or to loosen the same, and the saw blade E can be entirely removed from the handle bar A and front bar D without disconnecting the individual members of the saw frame.

Having thus described my invention, I claim as new and desire to secure by Letters Patent—

1. A saw frame comprising the front and rear bars, a rigid spacer bar fixedly secured to the rear or handle bar and movably connected with the upper end of the front bar, a brace secured to the spacer bar and pivotally connected at its front end to the middle portion of the front bar to serve as the fulcrum thereof, a screw rod extending longitudinally along the spacer bar with its threaded end extended through an aperture in the upper end of the front bar and there provided with a nut, the inner end of the rod being provided with an eccentric strap, an eccentric pivoted to the rigid spacer bar and working in the said strap and a handle for the eccentric, substantially as described.

2. A saw frame comprising the front bar and rear or handle bar, a rigid spacer bar forked at its rear extremity and there secured in recesses in the upper end of the handle bar, the upper member of the fork being provided with a ⋂ shaped strap which embraces said handle bar, the front end of the spacer bar being movably connected with the upper end of the front bar, a brace secured at its inner end to the spacer bar and pivotally connected at its forward lower end to the middle of the front bar to serve as the fulcrum thereof, an eccentric pivoted on top of the rigid spacer bar near the forward end thereof and provided with a handle, an eccentric strap encircling said eccentric and provided with a screw rod extending forwardly through the upper end of the front bar, and a nut on the outer end of said rod, substantially as described.

HENRY J. FREDERICK.

Witnesses:
J. M. ELDER,
D. R. ELDER.